(12) United States Patent
Rosen et al.

(10) Patent No.: US 7,958,443 B2
(45) Date of Patent: Jun. 7, 2011

(54) SYSTEM AND METHOD FOR STRUCTURING SPEECH RECOGNIZED TEXT INTO A PRE-SELECTED DOCUMENT FORMAT

(75) Inventors: Lee Rosen, Milford, CT (US); Ed Roe, Plant City, FL (US); Wade Poust, Hickory, NC (US)

(73) Assignee: Dictaphone Corporation, Stratford, CT (US)

( * ) Notice: Subject to any disclaimer, the term of this patent is extended or adjusted under 35 U.S.C. 154(b) by 1010 days.

(21) Appl. No.: 10/375,045

(22) Filed: Feb. 28, 2003

(65) Prior Publication Data

US 2004/0172245 A1    Sep. 2, 2004

(51) Int. Cl.
  *G06F 17/21* (2006.01)
  *G06F 17/20* (2006.01)
(52) U.S. Cl. .......................... 715/224; 715/223
(58) Field of Classification Search .................. 704/235; 715/221–226
  See application file for complete search history.

(56) References Cited

U.S. PATENT DOCUMENTS

| | | | |
|---|---|---|---|
| 5,689,585 A * | 11/1997 | Bloomberg et al. | 382/229 |
| 5,809,318 A | 9/1998 | Rivette et al. | |
| 5,875,429 A * | 2/1999 | Douglas | 704/275 |
| 5,883,986 A * | 3/1999 | Kopec et al. | 382/310 |
| 5,924,068 A * | 7/1999 | Richard et al. | 704/260 |
| 5,950,214 A | 9/1999 | Rivette et al. | |
| 5,991,780 A | 11/1999 | Rivette et al. | |
| 6,100,882 A * | 8/2000 | Sharman et al. | 704/235 |
| 6,279,017 B1 | 8/2001 | Walker | |
| 6,529,902 B1 | 3/2003 | Kanevsky et al. | |
| 6,789,060 B1 * | 9/2004 | Wolfe et al. | 704/235 |
| 6,915,254 B1 * | 7/2005 | Heinze et al. | 704/9 |
| 2002/0002459 A1 * | 1/2002 | Lewis et al. | 704/260 |
| 2002/0091713 A1 | 7/2002 | Walker | |
| 2003/0018668 A1 | 1/2003 | Britton et al. | |
| 2003/0145282 A1 | 7/2003 | Thomas et al. | |
| 2004/0111265 A1 * | 6/2004 | Forbes | 704/260 |

FOREIGN PATENT DOCUMENTS

| | | |
|---|---|---|
| JP | 06-083807 | 3/1994 |
| JP | 2000-200273 | 7/2000 |

OTHER PUBLICATIONS

G. Greffenstette, P. Tapanainen, "What is a word, What is a sentence? Problems of Tokenization," 3rd Conference on Computational Lexicography and Text Research. Complex '94, Budapest, Jul. 7-10, 1994.

(Continued)

*Primary Examiner* — David R Hudspeth
*Assistant Examiner* — Samuel G Neway
(74) *Attorney, Agent, or Firm* — Wolf, Greenfield & Sacks, P.C.

(57) ABSTRACT

A system for creating a structured report using a template having at least one predetermined heading and formatting data associated with each heading. The steps include recording a voice file, creating a speech recognized text file corresponding to the voice file, identifying the location of each heading in the text file, and the text corresponding thereto, populating the template with the identified text corresponding to each heading, and formatting the populated template to create the structured report.

20 Claims, 1 Drawing Sheet

OTHER PUBLICATIONS

J.C. Reynar, A. Ratnaparkhi, "A Maximum Entropy Approach to Identifying Sentence Boundaries." In Proceedings of the Fifth Conference on Applied Natural Language Processing, Washington D.C., 1997: 16-19.

D.D. Palmer, M.A. Hearst, "Adaptive multilingual sentence boundary disambiguation," Computational Linguistics 23(2),1997.

A. Mikheev, "Tagging sentence boundaries." in *NACL '2000*(Seattle), ACL Apr. 2000: 264-271.

H. Schmid, "Unsupervised Learning of Period Disambiguation for Tokenisation." Internal Report, IMS, University of Stuttgart, May 2000.

D. Yarowsky, "Homograph Disambiguation in Text-to-Speech Synthesis." in J. van Santen, R. Sproat, J. Olive and J. Hirschberg (eds.), Progress in Speech Synthesis. Springer-Verlag, 1996: 159-175.

D. Yarowsky, "Decision Lists for Lexical Ambiguity Resolution: Application to Accent Restoration in Spanish and French." In Proceedings of the 32nd Annual Meeting of the Association for Computational Linguistics. Las Cruces, NM, 1994: 88-95.

D. Yarowsky, "A Comparison of Corpus-based Techniques for Restoring Accents in Spanish and French Text." In Proceedings, 2nd Annual Workshop on Very Large Corpora. Kyoto, 1994: 19-32.

R. Sproat, "Multilingual Text Analysis for Text-to-Speech Synthesis," ECAI Workshop on Extended Finite-State Models of Language, 8/96, 1996.

R. Sproat, A.W. Black, S. Chen, S. Kumar, M. Ostendorf, C. Richards, "Normalization of Non-standard Words," Computer Speech and Language 15(3) 2001: 287-333.

T. Strzalkowski and R. Brandow, A Natural Language Correction Model for Continuous Speech Recognition, *Proceedings of the Fifth Workshop on Very Large Corpora*, pp. 168-177, Aug. 1997; http://acl.Idc.upenn.edu/W/W97/W97-0117.pdf.

M. Rayner et al., Combining Knowledge Sources to Reorder N-Best Speech Hypothesis List, *Proceedings DARPA Speech and Natural Language Workshop*, 1994; http://acl.Idc.upenn.edu/H/H94/H94-1040.pdf.

M. Ostendorf et al., Integration of Diverse Recognition Methodologies through Reevaluation of N-Best Sentence Hypotheses, *Proceedings of DARPA and Natural Language Workshop*, 1991; http://acl.Idc.upenn.edu/H/H91/H91-1013.pdf.

L. Norton et al., Recent Improvements and Benchmark Results for the Paramax ATIS System, *Proceedings of DARPA Workshop on Speech and Natural Language*, 1992; http://acl.Idc.upenn.edu/H/H92/H92-1017.pdf.

L. Hirschman, The Roles of Language Processing in a Spoken Language Interface, *Voice Communication Between Humans and Machines*, National Academy of Sciences, 1994, pp. 217-237; http://www.pnas.org/cgi/reprint/92/22/9970.

R. C. Moore, Integration of Speech with Natural Language Processing, *Voice Communication Between Humans and Machines*, National Academy of Sciences, 1994, pp. 254-271; http://www.pnas.org/cgi/reprint/92/22/9983.

J. Kupiec, Probabilistic Models of Short and Long Distance Word Dependencies in Running Text, *Proceedings of DARPA Speech and Natural Language Workshop*, 1992, pp. 290-295; http://acl.Idc.upenn.edu/H/H89/H89-1054.pdf.

H. Murveit and R. Moore, Integrating Natural Language Constraints into HMM-Based Speech Recognition, IEEE, 1990, pp. 573-576.

G. Maltese and F. Mancini. An Automatic Technique To Include Grammatical and Morphological Information in a Trigram-Based Statistical Language Model, *IEEE International Conference on Acoustics, Speech, and Signal Processing*, 1992, pp. 157-160.

R. Schwartz et al., On Using Written Language Training Data for Spoken Language Modelling, *Proceedings of Human Language Technology Workshop*, Morhan Kaufmann Publishers, Inc., 1994, pp. 94-98; http://acl.Idc.upenn.edu/H/H94/H94-1016.pdf.

E. K. Ringger and J. F. Allen, Error Correction via a Post-Processor for Continuous Speech Recognition, *In Proc. Of ICASSP-96, IEEE-96*, 1996.

Japanese Office Action from Japanese Application No. JP 2006-540706 dated Jul. 8, 2010.

U.S. Appl. No. 10/447,290, filed May 29, 2003 by Boone et al.

\* cited by examiner

SYSTEM AND METHOD FOR STRUCTURING SPEECH RECOGNIZED TEXT INTO A PRE-SELECTED DOCUMENT FORMAT

BACKGROUND OF THE INVENTION

The present invention relates generally to structuring, correcting, and formatting speech recognized text.

Today's speech recognition technology enables a computer to transcribe spoken words into computer recognized text equivalents. Speech recognition is the process of converting an acoustic signal, captured by a transducive element, such as a microphone or a telephone, to a set of words. These words can be used for numerous applications including data entry and word processing. The development of speech recognition technology has traditionally focused on accurate speech recognition, which has been a formidable task due to the wide variety of pronunciations, individual accents, and speech characteristics of individual speakers. Today's leading speech recognition software includes features for continuously learning the vocabulary and grammar of specific users.

Even with this improved speech recognition software, a transcriber or correctionist is often still necessary to correct mistakes. Additionally, a transcriber plays an important role in formatting the outputted text into a pre-determined structured format. Formatting speech recognized text into formatted reports is common in many professions that rely on dictation to maximize efficiency, such as is found in the medical professions. Currently, a transcriber will review and correct the unstructured text, create headings, format certain text, and cut and paste different sections of text in order to create the desired report format. This additional formatting work provides longer transcription times and reduced productivity, thereby mitigating the benefits of speech recognition. What is needed is a system for simplifying this process of structuring and formatting speech recognized text.

SUMMARY OF THE INVENTION

The present invention overcomes the above-discussed shortcomings and satisfies a significant need for providing a speech recognition correction system that automatically creates a structured report. A system in accordance with certain teachings of the present invention will increase productivity by reducing the number of man-hours necessary to correct speech recognized text that is used for generating standard reports. The steps include creating a template having a user-defined format having at least one predetermined heading, selecting a voice file and a corresponding speech recognized text file, identifying the location of each heading in the text file, and the text corresponding thereto, and populating the template with the identified text corresponding to each heading.

The identifying step contains two phases. The automatic correction phase is carried out by computer which automatically locates and marks each heading in the speech recognized text file. The manual correction phase is carried out by a transcriber who locates any unmarked headings in the speech recognized text file and marks each unmarked heading using a hot key corresponding to each heading that is predefined in the template. The populated template is then converted into a into a word processing file, which is then formatted either automatically or manually into final report. A template created in accordance with the present disclosure may also contain formatting data that corresponds to each heading and can be automatically applied to each heading and corresponding text section in the word processing file. Such formatting data includes but is not limited to font, font size, holding, underlining, italics, spacing, and alignment.

The above advantages and features are of representative embodiments only, and are presented only to assist in understanding the invention. It should be understood that they are not to be considered limitations on the invention as defined by the claims, or limitations on equivalents to the claims. Additional features and advantages of the invention will become apparent from the drawings, the following description, and the claims.

BRIEF DESCRIPTION OF THE DRAWINGS

While the specification concludes with claims particularly pointing out and distinctly claiming the present invention, it is believed the same will be better understood from the following description taken in conjunction with the accompanying drawings, which illustrate, in a non-limiting fashion and the best mode presently contemplated for carrying out the present invention, wherein:

DESCRIPTION OF ILLUSTRATIVE EMBODIMENTS

Figure 1:
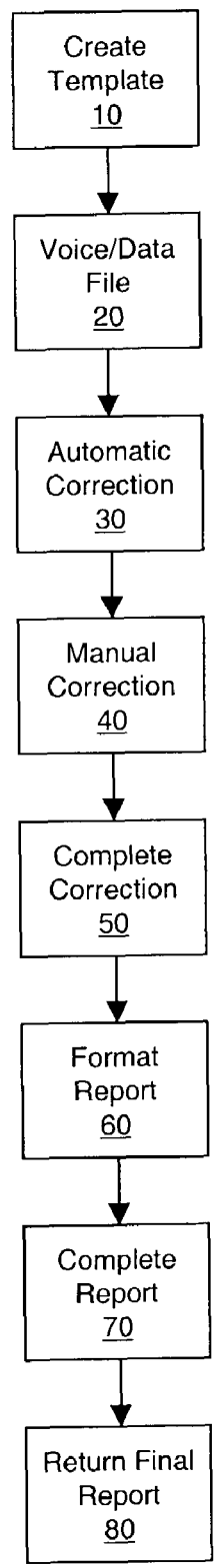
FIG. 1 is a flow diagram depicting a system for formatting speech recognition text in accordance with certain teachings of the present invention.

The present disclosure will now be described more fully with reference to FIG. 1 in which a flow diagram showing a preferred embodiment of the present disclosure is shown. The subject matter of this disclosure may, however, be embodied in many different forms and should not be construed as being limited to the embodiments set forth herein.

Referring to FIG. 1, a flow diagram generally illustrates the steps for formatting unstructured speech recognized text in accordance with certain teachings of the present disclosure. First, as shown in Box 10, a template is created identifying the section headings and the formatting information for a final report. It is intended that such a template can be created by a programmer for a single specific application, or can be created by a template wizard as part of a speech recognition correction software package. The template is designed to store headings that are assigned an indicator, and are preferably associated with a special keystroke, which can ultimately be used to manually mark and identify a heading in a speech recognized text file. When used within a speech recognized text file, each heading indicator can be saved in its particular location within the text file. Hundreds of headings can be associated with a template depending on the requirements for each template. Other formatting characteristics, such as font characteristics (type, size, bolding, italics, underlining, etc.) and alignment, can also be added to the template in order to automatically format the final report format.

Box 20 represents the first step of the correction process in which a voice/data wave file is created. A voice wave file is recorded using traditional methods for dictation recording. While speaking, the dictator should dictate section headings prior to stating the information that belongs in that section of the report. These section headings should correspond with the exact section headings stored in the template created in Box 10. For example, a doctor dictating the family history of a patient would dictate the heading FAMILY HISTORY prior to discussing the family history of a patient (presuming that FAMILY HISTORY is a heading stored in the template). After the voice file is created, speech recognition software is used to create a text file corresponding to the voice wave file.

This text file is then packaged within the voice wave file to create a voice/data file, which is then stored and ultimately forwarded to a transcriber for corrections.

Box 30 represents the third step of the process in which the correction software retrieves the voice/data file and unpackages it, sending the voice wave data to the media player, and sending the associated text data to the screen in an editor window. The correction software may be included with the speech recognition software or may be a separate software program. The text file is then parsed and displayed on the transcriber's screen in an editor window. The displayed text data now includes not only the text of the transcribed voice file, but also contains the indicators for each section heading, which is automatically marked by the correction software. Either automatically or by prompt, the correction software may also display the text file separated by the automatically recognized section headings within a separate window on the screen. All of the section headings that are available for the template may also be displayed in another window, accompanied by each section's template-defined hot key. This guide can be used by the transcriber to manually add additional section headings and breaks during the manual correction step as described further in Box 40.

Box 40 represents the fourth step of the process where the transcriber makes manual corrections to the text file while listening to the voice wave file. Such manual corrections include but is not limited to correcting misrecognized or unrecognized words, as well as adding new section heading markers in the body of the text. While the voice file is playing from the media player, an indication is displayed in the text coinciding with the voice playback. While making manual corrections, a hot key (such as a function key, for example), which is associated with each section heading in the template, can be used to manually apply section heading markers within the speech recognized text file. This could normally be necessary if the dictator failed to dictate a section heading, misstated a section heading, or if the section heading was otherwise not recognized by the speech recognition software.

Box 50 represents the fifth step of the process, which is completion of the editing process. Once the document has been corrected and all section headings have been identified either automatically (correction software successfully matched the section heading from the text file with template-defined section headings) or manually (transcriber manually entered a template-defined hot key marker that relating to a section heading), the correction process is over. The correction software will have a COMPLETE CORRECTION or similar prompt that can then be used. The correction software will then output the corrected text file into a word processing format, creating a draft report following the template format. This draft report will list each section in order, with each accompanying text section placed under the correct section heading. Furthermore, depending on the format information contained in the template, font characteristics, spacing, and alignment also be applied to this draft report.

Box 60 represents the final step of the correction process in which the transcriber further formats the draft report in the word processing format, including spell checking and alignment. Once the draft report is fully formatted and corrected, the COMPLETE REPORT or similar prompt may be used to save the final report onto the server (Box 70). Finally, the report may then be returned to the dictator as shown in Box 80.

EXAMPLE

The disclosed subject matter will now be described in relation to an illustrative example. A template created for a hospital in accordance with certain teachings of the present disclosure may have the following stored information, including but not limited to the order of each section in the final report, the name of each section heading, an abbreviation used for each heading to be marked in the text file, and a hotkey assigned to each heading for use during manual correction:

| Location | Name | Abbreviation | Hot Key |
|---|---|---|---|
| 1 | Family History | FH | <F1> |
| 2 | Medical History | SH | <F2> |
| 3 | Impression | IM | <F3> |
| 4 | Discharge Summary | DI | <F4> |

While treating a patient, a doctor would record a voice file, clearly stating the name of each section heading prior to dictating the medical impressions for that section. An unstructured speech recognized text file created from such a recording might appear as follows (where the "blah blah . . . represents the medical impressions dictated by the doctor):

FAMILY HISTORY blah blah blah blah . . . MEDICAL HISTORY blah blah blah . . . DISCHARGE INSTURCTIONS blah blah blah blah . . . IMPRESSION blah blah . . .

This text file is then packaged with the corresponding voice file and routed to a transcriber. Using a correction software in accordance with certain teachings of the present disclosure, the text file is parsed and each of the heading sections are automatically marked within the text. In this example, note that the doctor mistakenly dictated the heading within the text. In this example, note that the doctor mistakenly dictated the heading DISCHARGE INSTRUCTIONS instead of the template heading DISCHARGE SUMMARY. The transcriber, while making manual corrections, could manually mark DISCHARGE INSTRUCTIONS as a DISCHARGE SUMMARY heading by hitting the <F4> key when the indicator is at the appropriate text.

After manual corrections are complete, the transcriber would hit the COMPLETE CORRECTION prompt, which would generate a draft report in a word processing format. In this draft final report, all section headings and their corresponding text sections would bear all formatting information (font, bolding, alignment, etc.) stored in the template and would appear in the specified template order. In this word processing file, the transcriber then has the ability to spell check the report and correct any other further formatting and alignment issues. A final report for this example, fully formatted, might appear as follows:

A. FAMILY HISTORY
blah blah blah blah...
B. MEDICAL HISTORY
blah blah blah...
C. IMPRESSION
blah blah...
D. DISCHARGE INSTRUCTIONS
blah blah blah blah...

It will be apparent to one of skill in the art that described herein is a novel system for automatically structuring and formatting speech recognized text. While the invention has been described with reference to specific preferred embodiments, it is not limited to these embodiments. The invention may be modified or varied in many ways and such modifications and variations as would be obvious to one of skill in the art are within the scope and spirit of the invention and are included within the scope of the following claims.

What is claimed is:

1. A method for generating a structured report in a computer system comprising at least one processor, said method comprising acts of:
   obtaining an electronic text file generated at least in part by performing speech recognition processing on a voice file;
   identifying a plurality of section headings associated with a report template different from the electronic text file, the report template specifying an ordering of the plurality of section headings and, for each section heading of the plurality of section headings, a corresponding marker to be inserted into the electronic text file;
   automatically locating, within the electronic text file, one or more occurrences of text corresponding to at least some of the plurality of section headings;
   for each occurrence of text corresponding to a section heading in the electronic text file, automatically inserting the corresponding marker into the electronic text file to mark a location of the occurrence of text corresponding to the section heading; and
   using the at least one processor to automatically generate a structured report according to the report template, the structured report having a plurality of sections corresponding to at least some of the plurality of section headings associated with the report template and being populated with portions of the electronic text file based at least in part on the markers inserted into the electronic text file to indicate locations of occurrences of text corresponding to section headings, wherein an order in which the plurality of sections appear in the structure report conforms to the ordering of the plurality of section headings specified by the report template.

2. The method of claim 1, further comprising acts of:
   receiving manual input from a user to mark a location of a previously unmarked occurrence of text corresponding to a section heading; and
   in response to receiving the manual input, inserting the corresponding marker into the electronic text file to mark the location of the previously unmarked occurrence of text corresponding to the section heading.

3. The method of claim 2, wherein the manual input is provided by the user using at least one key stroke specified by the report template as corresponding to the section heading.

4. The method of claim 1, further comprising acts of:
   obtaining, from the report template, formatting data associated with at least one section heading of the plurality of section headings; and
   automatically formatting a section of the structured report based on the formatting data, the section corresponding to the at least one section heading.

5. The method of claim 4, wherein the act of automatically formatting comprises applying at least one format selected from a group consisting of: font, font size, bolding, underlining, italics and alignment.

6. The method of claim 1, further comprising an act of:
   creating the report template based at least in part on user input, the user input comprising at least one section heading.

7. The method of claim 6, wherein the user input further comprises a user format to be applied to a section corresponding to the at least one section heading.

8. The method of claim 1, wherein the one or more occurrences of text correspond exactly to the at least some of the plurality of section headings.

9. A system for generating a structured report based on a voice file and a report template, the system comprising at least one processor programmed to:
   obtain an electronic text file generated at least in part by performing speech recognition processing on the voice file, the electronic text file being different from the report template;
   identify a plurality of section headings associated with the report template, the report template specifying an ordering of the plurality of section headings and, for each section heading of the plurality of section headings, a corresponding marker to be inserted into the electronic text file;
   automatically locate, within the electronic text file, one or more occurrences of text corresponding to at least some of the plurality of section headings;
   for each occurrence of text corresponding to a section heading in the electronic text file, automatically insert the corresponding marker into the electronic text file to mark a location of the occurrence of text corresponding to the section heading; and
   automatically generate a structured report according to the report template, the structured report having a plurality of sections corresponding to at least some of the plurality of section headings associated with the report template and being populated with portions of the electronic text file based at least in part on the markers inserted into the electronic text file to indicate locations of occurrences of text corresponding to section headings, wherein an order in which the plurality of sections appear in the structure report conforms to the ordering of the plurality of section headings specified by the report template.

10. The system of claim 9, wherein the at least one processor is further programmed to:
    receive manual input from a user to mark a location of a previously unmarked occurrence of text corresponding to a section heading; and
    in response to receiving the manual input, insert the corresponding marker into the electronic text file to mark the location of the previously unmarked occurrence of text corresponding to the section heading.

11. The system of claim 10, wherein the manual input is provided by the user using at least one key stroke specified by the report template as corresponding to the section heading.

12. The system of claim 9, wherein the at least one processor is further programmed to:
    obtain, from the report template, formatting data associated with at least one section heading of the plurality of section headings; and automatically format a section of the structured report based on the formatting data, the section corresponding to the at least one section heading.

13. The system of claim 12, wherein the at least one processor is further programmed to format the section of the structured report by applying at least one format selected from a group consisting of: font, font size, bolding, underlining, italics and alignment.

14. The system of claim 9, wherein the at least one processor is further programmed to:
　create the report template based at least in part on user input, the user input comprising at least one section heading.

15. The system of claim 14, wherein the user input further comprises a user format to be applied to a section corresponding to the at least one section heading.

16. The system of claim 9, wherein the one or more occurrences of text correspond exactly to the at least some of the plurality of section headings.

17. A non-transitory computer storage having stored thereon computer-executable instructions that, when executed by a computer, perform a method for generating a structured report according to a report template, the method comprising acts of:
　obtaining an electronic text file generated at least in part by performing speech recognition processing on a voice file;
　identifying a plurality of section headings associated with a report template different from the electronic text file, the report template specifying an ordering of the plurality of section headings and, for each section heading of the plurality of section headings, a corresponding marker to be inserted into the electronic text file;
　automatically locating, within the electronic text file, one or more occurrences of text corresponding to at least some of the plurality of section headings;
　for each occurrence of text corresponding to a section heading in the electronic text file, automatically inserting the corresponding marker into the electronic text file to mark a location of the occurrence of text corresponding to the section heading; and
　automatically generate a structured report according to the report template, the structured report having a plurality of sections corresponding to at least some of the plurality of section headings associated with the report template and being populated with portions of the electronic text file based at least in part on the markers inserted into the electronic text file to indicate locations of occurrences of text corresponding to section headings, wherein an order in which the plurality of sections appear in the structure report conforms to the ordering of the plurality of section headings specified by the report template.

18. The non-transitory computer storage of claim 17, wherein the method further comprises acts of:
　receiving manual input from a user to mark a location of a previously unmarked occurrence of text corresponding to a section heading, the manual input comprising at least one key stroke specified by the report template as corresponding to the section heading; and
　in response to receiving the manual input, inserting the corresponding marker into the electronic text file to mark the location of the previously unmarked occurrence of text corresponding to the section heading.

19. The non-transitory computer storage of claim 17, wherein the method further comprises acts of:
　obtaining, from the report template, formatting data associated with at least one section heading of the plurality of section headings; and
　automatically formatting a section of the structured report based on the formatting data, the section corresponding to the at least one section heading.

20. The non-transitory computer storage of claim 17, wherein the method further comprises an act of:
　creating the report template based at least in part on user input, the user input comprising at least one section heading and a user format to be applied to a section corresponding to the at least one section heading.

\* \* \* \* \*